Patented Jan. 20, 1953

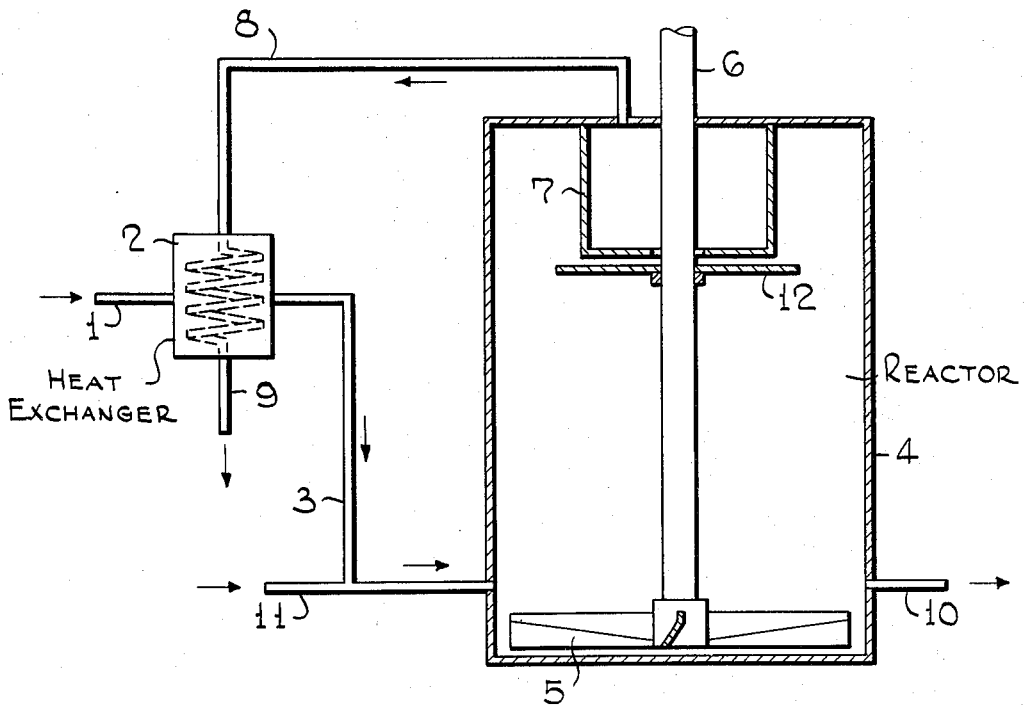

2,626,293

UNITED STATES PATENT OFFICE 2,626,293

SLURRY POLYMERIZATION PROCESS

Sumner B. Sweetser, Cranford, N. J., assignor to Standard Oil Development Company, a corporation of Delaware Application March 29, 1951, Serial No. 218,160

6 Claims. (Cl. 260—683.15)

This invention relates to the polymerization of normally gaseous olefins to liquid hydrocarbons comprising essentially aliphatic polymers or copolymers suitable for use in the manufacture of motor fuel, detergents and Oxo products.

Conventional polymerization processes utilizes a moderately active catalyst in a fixed bed operation. The catalyst is packed inside long tubes around which a cooling medium circulates. These tubes are normally 2 to 5 inches in diameter. Another type process utilizes large chambers packed with the catalyst. Due to the large amount of heat produced in the polymerization reaction, more or less local overheating occurs in these catalyst beds, whether in tubes or chambers, and much of the catalyst in the bed is therefore deactivated as the process proceeds; usually only a small portion of the catalyst is actually being efficiently utilized at any given time. A temperature gradient between the inlet and outlet of the reactor is inherent in fixed bed processes. Even when the gradient is insufficient to deactivate the catalyst only a small part of the catalyst is at optimum temperature. In the initial stages of the process the initial 20 or 30 per cent of the catalyst is doing the bulk of the polymerization; later this catalyst will become inactive and often fused together so that only the last portions of the catalyst are being used.

In copending application, Serial No. 152,858, filed March 30, 1950, in the name of William K. Fell and John D. Leslie, it has been suggested that this difficulty might be overcome by utilizing a fluidized solid or slurry type operation with finely divided catalyst suspended in or slurried in the fluid reactants. Finely divided silica gel is maintained in co-suspension with the catalyst to prevent agglomeration thereof. However operational experience indicates that, although very little agglomeration of the catalyst occurs when this diluent is used, the catalyst loses activity fairly rapidly. It has now been found that this loss in activity can be overcome by partially deactivating the silica gel before using it as a diluent. This deactivation results in a reduction in surface area.

The range of surface area over which silica gels are effective is from 50–300 m.$^2$/g. while the preferred range of surface area is from 100–250 m.$^2$/g. Silica gels in this general range of surface area can be obtained by heating fresh silica gel for three-fourths to two hours at 1800° F.

The amount of silica gel diluent used in co-suspension will depend on the agglomerating tendencies of the catalyst but in general will range from about 10–50%. With 80% phosphoric acid on 20% kieselguhr as the polymerization catalyst the preferred concentration of silica gel diluent is from 15–25%.

In one specific embodiment, the present invention comprises a process for the production of normally liquid hydrocarbons from a normally gaseous olefin fraction comprising propylene or butylene by passing the normally gaseous olefin fraction upwardly through a finely divided mechanically stirred polymerization catalyst 40 mesh or finer in which silica gel is co-suspended as a diluent at a temperature between 350 and 600° F., superatmospheric pressure of about 1000 lbs./sq. in. or more and at a velocity of one to two feet per minute. By operating in this manner, the olefin fraction is thoroughly mixed with the catalyst which is kept in suspension in the material being polymerized. The pressure is kept above the critical to avoid at any time the coexistence of a gaseous and liquid state. At these temperatures and pressures the olefins are in that nebulous state wherein it is difficult to determine whether the material is liquid or gaseous, the change from one to the other occurring gradually and without discontinuity. It follows therefore, that at any given time the mixture of olefins and finely divided catalyst may be called either a slurry or a fluidized mass, the change from one to the other not being perceptible, although both states are not present simultaneously.

The feed material may be a pure of substantially pure $C_3$ or $C_4$ olefin or a mixture of these with or without the corresponding saturated hydrocarbons.

The manner in which the present invention is carried out will be fully understood from the following description when read with reference to the accompanying drawing.

A normally gaseous $C_3$, $C_4$ hydrocarbon fraction containing 50% paraffins and 50% olefins, the latter consisting of 50% propylene and 50% butylene, is introduced at 100° F. and about 1000 lbs./sq. in. gage by line 1 to heat exchanger 2 where it is heated to 250° F. The heated feed is then introduced by line 3 into the bottom of reaction zone 4 maintained under 1000 lbs./sq. in. gage pressure and at a temperature of 450° F. The reaction zone contains a finely divided catalyst consisting of phosphoric acid deposited on kieselguhr of about 40–100 mesh. The feed is introduced upwardly through this catalyst at about 0.25 to 2.5 gallons of feed per hour per pound of catalyst and is agitated by stirrer 5 rotating on shaft 6 so that the catalyst is maintained in suspension in the feed. Thus the more dense catalyst particles will lag behind the less dense olefins and the catalyst will concentrate in the lower portion of the reaction zone in a dense phase mass which acts as if it had a level similar to a boiling liquid.

To prevent agglomeration of the catalyst, there is co-suspended with it about 10–50% by weight of finely divided, partially deactivated silica gel of from 40–100 mesh.

The proper state of hydration of the catalyst, if necessary, may be maintained by the introduction of regular quantities of water. This is not illustrated in the drawing but may readily be accomplished by well known means. For example the feed may be contacted with water at a temperature where the saturation value is the quantity of water desired.

The products from zone 4 including products boiling for the most part in the motor fuel boiling range, and all $C_3$ and $C_4$ saturated hydrocarbons are removed through shroud 7 by line 8 and passed through heat exchanger 2 where they give up heat to incoming feed. The cooled products are then passed by line 9 to any desired fractionating or stabilizing means, not shown.

From time to time catalyst is removed from reaction zone 4 through line 10 and burned or otherwise disposed of. Makeup catalyst is added by line 11. The process is thus non-regenerative. A rotating baffle 12 is attached to shaft 6 just below the shroud 7. Shroud 7 is an enlarged outlet, the cross-sectional area of which is such that the rate of flow of the effluent therethrough is less than the settling rate of the catalyst. This together with the baffle helps to keep the catalyst from being thrown into the shroud and the rotation prevents the catalyst from settling on the baffle.

Data presented in the following tabulation show the results obtained with silica gels which have been deactivated to different extents and used in the polymerization of a $C_4$ feed consisting of 43.1% olefins at a temperature of 450° F. and 1000 lbs./sq. in. using as catalyst phosphoric acid supported on kieselguhr. The silica gel used amounted to 20% of the catalyst mixture:

| Run No. | Surface area of gel, m.$^2$/g. | Olefin conv. weight percent | Condition of used catalyst |
|---|---|---|---|
| 1 | 0.5 | 76 | Agglom. |
| 2 | 180 | 87 | Free. |
| 3 | 235 | 86 | Do. |
| 4 | 450 | 79 | Do. |

The fresh silica gel used in the above experiments had a surface area of about 650 m.$^2$/g. The gels used in the above experiments were heated at temperatures of 1600–1800° F. for varying lengths of time to give the surface area shown in the above tabulation. It is evident from the above data that silica gels of low and of high surface areas were unsuitable for use as diluents but the gels of intermediate surface area were quite satisfactory. It is believed that the silica gels are effective in preventing agglomeration by absorbing high molecular weight, hydrogen-deficient polymers which otherwise are adsorbed on the catalyst and then make the catalyst particles stick together. If the silica gel has too low a surface area it does not have sufficient adsorptive capacity to retain the high molecular weight polymers and agglomeration of the catalyst results. On the other hand, if the silica gel has too high a surface area it adsorbs not only the high molecular weight polymers but also the free acid from the catalyst. In this case there is no catalyst agglomeration but the catalyst gradually loses activity. By selecting a silica gel of intermediate surface area there is still adsorptive capacity to retain the high molecular weight polymers without adsorbing appreciable amounts of free acid from the catalyst. In this case agglomeration is prevented and good conversion is still obtained.

While I have herein illustrated and described one embodiment of the invention with considerable particularity, I do not desire to limit myself thereto or to the carrying out of my method by the use of apparatus of that character alone, as it will be evident that various changes may be made in the details thereof, if desired, without departing from its principal features and characteristics and from the spirit and scope of my invention as defined in the appended claims.

For example, the catalyst may be supported by supports other than kieselguhr, for example, silica gel, activated carbon and the like.

The nature of the present invention having been thus fully set forth and specific examples of the same given, what is claimed as new and useful and desired to be secured by Letters Patent is:

1. In the non-regenerative catalytic process of polymerizing olefins in which an olefin feed is continuously introduced into a reaction zone containing a cosuspension of finely divided catalyst comprising phosphoric acid deposited on a solid carrier and finely divided silica gel diluent in fluid hydrocarbon and in which effluent containing polymerized olefins is withdrawn continuously from said zone while maintaining said catalyst and silica gel in said suspension within said zone, said silica gel having an original surface area of above about 450 m.$^2$/g., the improvement which comprises heat treating said silica gel, prior to addition to said suspension, to obtain a reduced surface area in the range of about 50 to 300 m.$^2$/g. whereby both agglomeration and loss of activity of said catalyst are minimized.

2. In the non-regenerative catalytic process of polymerizing normally gaseous olefins which includes the steps of forming in a reaction zone an agitated suspension of finely divided catalyst comprising phosphoric acid deposited on a solid carrier and in the range of 10 to 50% by weight, based on the catalyst, of finely divided silica gel diluent interdispersed therewith, continuously passing olefin feed into said suspension under polymerization conditions, and continuously removing from said reaction zone a substantially solid-free effluent including polymerized olefins while maintaining said catalyst and diluent in said suspension within said zone, said silica gel having an original surface area above about 450 m.$^2$/g., the improvement which comprises employing as said diluent silica gel that, prior to addition to said suspension, has been heat treated to obtain a reduced surface area in the range of about 100 to 250 m.$^2$/g. whereby both agglomeration and loss of activity of said catalyst are minimized during said polymerization.

3. Process according to claim 1 in which the heat treated silica gel has a surface area between 100 and 250 m.$^2$/g.

4. Process according to claim 3 in which the diluent is present in an amount equal to about 10–50% by weight of the catalyst and the temperature is maintained between 350 and 600° F. and the pressure at about 1000 pounds per square inch gage.

5. Process according to claim 3 in which the catalyst is phosphoric acid on kieselguhr.

6. Process according to claim 5 in which in the range of 15–25% silica gel diluent, based on the catalyst, is used.

SUMNER B. SWEETSER.

REFERENCES CITED

The following references are of record in the file of this patent:

UNITED STATES PATENTS

| Number | Name | Date |
|---|---|---|
| 2,354,261 | Hemminger | July 25, 1944 |
| 2,393,909 | Johnson | Jan. 29, 1946 |
| 2,453,874 | Sweetser | Nov. 16, 1948 |
| 2,459,444 | Main | Jan. 18, 1949 |
| 2,459,836 | Murphree | Jan. 25, 1949 |